(12) United States Patent
Iwase et al.

(10) Patent No.: US 8,688,250 B2
(45) Date of Patent: Apr. 1, 2014

(54) CONTENT DATA REPRODUCTION APPARATUS AND A SOUND PROCESSING SYSTEM

(75) Inventors: Hiroyuki Iwase, Hamamastsu (JP); Takuro Sone, Hamamatsu (JP)

(73) Assignee: Yamaha Corporation (JP)

( * ) Notice: Subject to any disclaimer, the term of this patent is extended or adjusted under 35 U.S.C. 154(b) by 222 days.

(21) Appl. No.: 13/071,821

(22) Filed: Mar. 25, 2011

(65) Prior Publication Data

US 2011/0245945 A1 Oct. 6, 2011

(30) Foreign Application Priority Data

Mar. 31, 2010 (JP) .................................. 2010-80436

(51) Int. Cl.
*G06F 17/00* (2006.01)
(52) U.S. Cl.
USPC ...................... 700/94; 455/414.3; 369/124.09
(58) Field of Classification Search
USPC ............................................ 700/94; 707/999
See application file for complete search history.

(56) References Cited

U.S. PATENT DOCUMENTS

| | | | |
|---|---|---|---|
| 5,612,943 A * | 3/1997 | Moses et al. ............. | 369/124.09 |
| 6,965,682 B1 | 11/2005 | Davis et al. | |
| 7,505,605 B2 | 3/2009 | Rhoads et al. | |
| 7,562,392 B1 | 7/2009 | Rhoads et al. | |
| 8,126,200 B2 | 2/2012 | Rhoads | |
| 8,180,844 B1 | 5/2012 | Rhoads | |
| 2002/0078146 A1 | 6/2002 | Rhoads | |
| 2004/0137929 A1 | 7/2004 | Jones et al. | |
| 2009/0132077 A1 * | 5/2009 | Fujihara et al. ................. | 700/94 |
| 2011/0028160 A1 | 2/2011 | Roeding et al. | |
| 2011/0029359 A1 | 2/2011 | Roeding et al. | |
| 2011/0029362 A1 | 2/2011 | Roeding et al. | |
| 2011/0029364 A1 | 2/2011 | Roeding et al. | |
| 2011/0029370 A1 | 2/2011 | Roeding et al. | |
| 2012/0064870 A1 * | 3/2012 | Chen et al. ................. | 455/414.3 |

FOREIGN PATENT DOCUMENTS

| | | |
|---|---|---|
| EP | 1422689 A2 | 5/2004 |
| JP | 2002-314980 A | 10/2002 |
| WO | 2011/014292 A1 | 2/2011 |

OTHER PUBLICATIONS

Extended European Search Report issued Jul. 27, 2011 for corresponding EP Patent Application No. 11160194.4.

* cited by examiner

*Primary Examiner* — Joseph J Nguyen
(74) *Attorney, Agent, or Firm* — Rossi, Kimms & McDowell LLP

(57) ABSTRACT

A reproduction apparatus 2 collects sounds on which spread codes are superimposed with a microphone 20 to calculate correlation values between the collected sound signals and the same spread codes as those of an apparatus which performed the superimposition to identify content reproduced by a reproduction apparatus 1 in accordance with the intensity of the peaks of the calculated correlation values. A control portion 22 identifies content which is correlated with the identified content and is necessary for the reproduction apparatus 2. The control portion 22 reads out the identified content data from a content data storage portion 25 to output the musical score data and the audio data to a display portion 23 and a reproduction portion 26, respectively. The display portion 23 displays the input musical score data on a screen, while the reproduction portion 26 reproduces the input audio data to generate sound signals.

15 Claims, 12 Drawing Sheets

FIG.4A

| song ID | song information | correlated content data | |
|---|---|---|---|
| 1014-19 | ABCDE··· | audio data AAA··· | musical score data BBB··· |
| 1015-79 | FGHI··· | audio data DDD··· | EEE·· |
| ⋮ | ⋮ | ⋮ | ⋮ |

FIG.4B

| song ID | song information | audio data | musical score data | song data |
|---|---|---|---|---|
| 1014-19 | ABCDE··· | AAA··· | BBB··· | CCC··· |
| 1015-79 | FGHI··· | DDD··· | EEE·· | FFF··· |
| ⋮ | ⋮ | ⋮ | ⋮ | ⋮ |

CONTENT DATA REPRODUCTION APPARATUS AND A SOUND PROCESSING SYSTEM

BACKGROUND OF THE INVENTION

1. Field of the Invention

The present invention relates to a content data reproduction apparatus for reproducing content data, and a sound processing system which uses the content data reproduction apparatus.

2. Description of the Related Art

Conventionally, there is a system by which song information is superimposed on audio data as an electronic watermark so that an apparatus which receives the audio data can identify content of the audio data (see Japanese Unexamined Patent Publication No. 2002-314980).

SUMMARY OF THE INVENTION

However, the conventional apparatus which receives the audio data merely identifies the content, without any collaborated operation with other apparatuses.

Therefore, the present invention provides a content reproduction apparatus which identifies content and allows collaborated operation with other apparatuses.

The content data reproduction apparatus of the present invention includes an input portion for inputting a sound signal on which first information for identifying content data which is to be reproduced is superimposed; a content data identification portion for identifying, on the basis of the first information superimposed on the sound signal, the content data which is to be reproduced; and a reproduction portion for reproducing the identified content data. The input portion may input the sound signal by collecting a sound with a microphone or by transmission over a line by use of an audio cable. Furthermore, the concept of the reproduction of the content data includes not only sounds but also display of images.

In the case of the sound signal on which the first information for identifying the content data is superimposed, as described above, content data which is reproduced by a different apparatus can be identified by demodulation of the first information. In a case where phase modulation is employed as the means for superimposition of data, for example, an apparatus which performs the modulation uses bit data (0, 1) of the information for identifying content data (content identification information) to phase-modulate (inverse) spread codes, while the apparatus which performs demodulation determines whether the peaks of the correlation values are positive or negative to decode the bit data.

The content data reproduction apparatus identifies the content data in accordance with the decoded bit data to further identify content data which is correlated with the identified content data and is necessary for the content data reproduction apparatus to reproduce the identified content data. The content necessary for the content data reproduction apparatus may be the same content data as that reproduced by the different apparatus or different content (e.g., the necessary content can be musical score data in a case where the different apparatus is reproducing audio data). In a case, for example, where the different apparatus is emitting sounds played by a piano (piano sounds on which content identification information is superimposed), the content data reproduction apparatus of the present invention can collect the piano sounds to reproduce accompaniment sounds as content data correlated with the piano sounds.

Furthermore, the content identification portion may identify necessary content data in accordance with content data which the reproduction portion is able to reproduce. In a case, for example, where the content data reproduction apparatus is a digital audio player which is able to reproduce audio data, the content identification portion identifies audio data as content data. In a case where the content data reproduction apparatus is an automatic performance apparatus, the content identification portion can identify musical instrument digital interface (MIDI) data as necessary content data. In a case where the content data reproduction apparatus is an apparatus having a display portion, the content identification portion can identify musical score data as necessary content data.

Furthermore, the information superimposed on the sound signal may include synchronization information indicative of timing at which the content data is reproduced. In a case, for example, where an apparatus which sends sound signals on which MIDI-compliant reference clock is superimposed as synchronization information, an apparatus which receives the sound signals is able to conduct automatic performance by operating a sequencer by use of the decoded reference clock. Therefore, the reproduction of content data by the different apparatus can be synchronized with the reproduction of content data by the content data reproduction apparatus. In a case where the different apparatus is an automatically played musical instrument (e.g., an automatically played piano) which reproduces MIDI data, when the content data reproduction apparatus of the present invention is placed near the different apparatus to collect piano sounds, the content data reproduction apparatus reproduces accompaniment sounds synchronized with the piano sounds. In a case where the content data reproduction apparatus of the present invention has a display portion, the content data reproduction apparatus is also able to display a musical score to indicate the currently reproduced position in synchronization with the piano sounds, even refreshing the displayed musical score with the progression of the reproduced song.

Furthermore, the content data reproduction apparatus may include a superimposition portion for superimposing second information which is information for identifying the content data which is to be reproduced, and is different from the first information on a sound signal of the content data which the reproduction apparatus is to reproduce. In this case, collaborated reproduction of content data among a plurality of content data reproduction apparatuses can be achieved. For example, the content data reproduction apparatus can retrieve content data from a different apparatus at a shop away from home, whereas the content data reproduction apparatus can superimpose information on the content data again at home to achieve collaborated operation among apparatuses regardless of differences in time and locations.

The content data reproduction apparatus may also be configured to transmit demodulated information and information indicative of content data which the content data reproduction apparatus is able to reproduce (e.g., information indicative of the function of the apparatus such as whether or not the apparatus has a display portion) to a server so that the server will extract correlated content data.

According to the present invention, the content data reproduction apparatus retrieves correlated content data which is correlated with identified content data and is necessary for the content data reproduction apparatus, and then reproduces the retrieved content data, allowing collaborated operation with other apparatuses.

BRIEF DESCRIPTION OF THE DRAWINGS

FIG. 4A is a diagram indicative of a database stored in a content data storage portion of the reproduction apparatus;

FIG. 4B is a diagram indicative of a database stored in a song information storage portion of a server;

DESCRIPTION OF THE PREFERRED EMBODIMENT

Figure 1A:
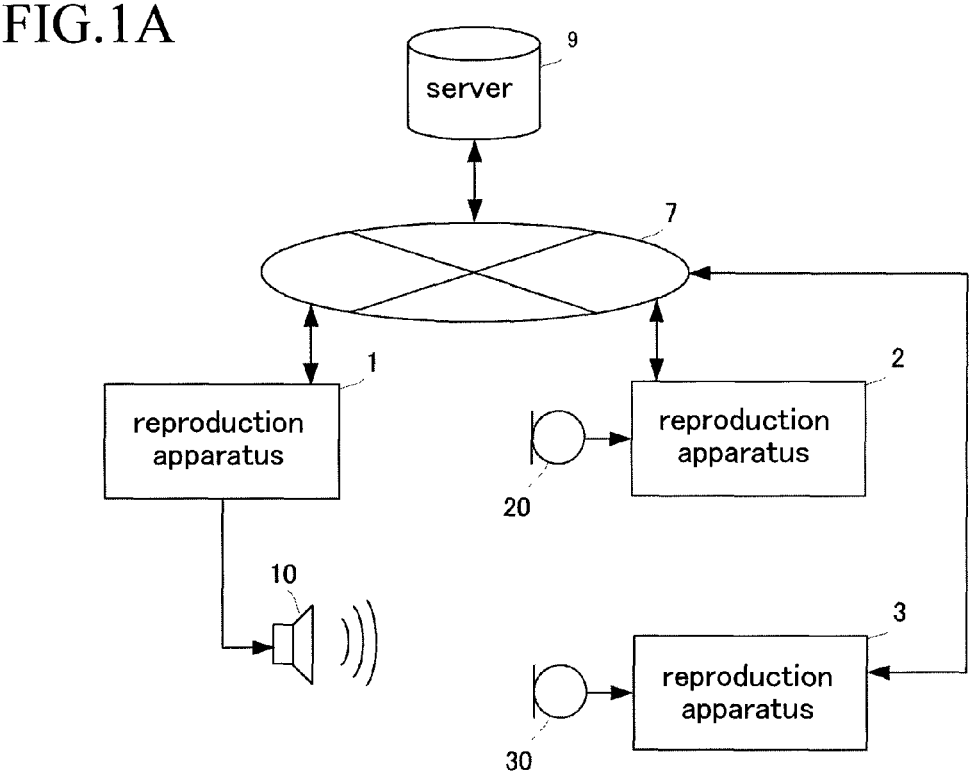
FIG. 1A is a block diagram indicative of an example fundamental configuration of a sound processing system.

FIG. 1A indicates the configuration of a sound processing system according to an embodiment of the present invention. The sound processing system has a reproduction apparatus 1, a reproduction apparatus 2, a reproduction apparatus 3 and a server 9 which are interconnected via a network 7. To the reproduction apparatus 1, a speaker 10 is connected. To the reproduction apparatus 2, a microphone 20 is connected. To the reproduction apparatus 3, a microphone 30 is connected. The reproduction apparatus 1 reproduces certain content data to emit sounds from the speaker 10 (emit musical tones played by a piano, for instance).

Figure 1B:
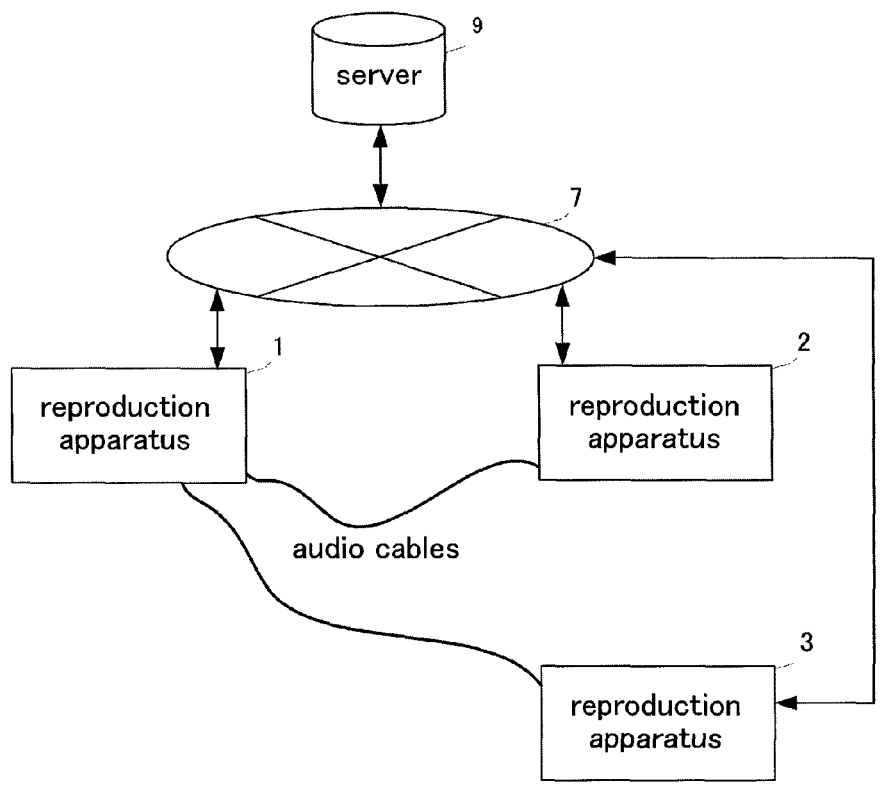
FIG. 1B is a block diagram indicative of the other example fundamental configuration of the sound processing system.

The microphone 20 and the microphone 30 may be either integrated into their respective reproduction apparatuses 2, 3 or provided externally via line terminals for the respective reproduction apparatuses 2, 3. As indicated in FIG. 1B, furthermore, the reproduction apparatuses 1, 2, 3 may be connected with each other through audio cables without microphones. The microphone 20 and the microphone 30 collect sounds (sounds emitted from the speaker 10) to output collected sound signals to the reproduction apparatus 2 and the reproduction apparatus 3, respectively. The reproduction apparatus 2 and the reproduction apparatus 3 identify the content currently reproduced by the reproduction apparatus 1 in accordance with information superimposed on the input sound signals to reproduce content data which is correlated with the content currently reproduced by the reproduction apparatus 1 and is necessary for themselves, respectively. In a case where the reproduction apparatus 2 and the reproduction apparatus 3 are not provided with respective content data necessary for themselves, the reproduction apparatus 2 and the reproduction apparatus 3 retrieve the respective necessary content data via the network to reproduce the retrieved content data. As described above, the sound processing system allows the apparatuses to collaborate with each other. In a case where the reproduction apparatus 1 is emitting sounds played by a piano (the sounds on which information for identifying content is superimposed), for example, the reproduction apparatus 2 collects the piano sounds to reproduce accompaniment tones as content correlated with the piano sounds.

Figure 2A:
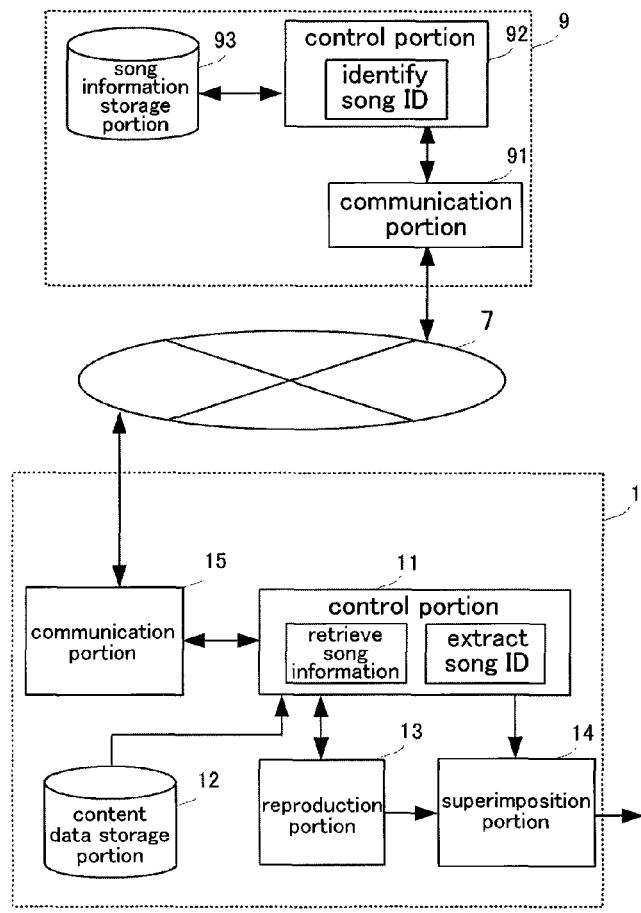
FIG. 2A is a block diagram indicative of a configuration of a reproduction apparatus 1 indicated in FIG. 1A.

FIG. 2A is a block diagram indicative of a configuration of the reproduction apparatus 1 and the server 9. The reproduction apparatus 1 has a control portion 11, a content data storage portion 12, a reproduction portion 13, a superimposition portion 14 and a communication portion 15. The server 9 has a communication portion 91, a control portion 92 and a song information storage portion 93.

To the control portion 11, content data is input from the content data storage portion 12. The content data, which is data in which song information such as the title of a song and the name of a singer is included, is formed of compressed data such as MPEG1 Audio Layer 3 (MP3), Musical Instrument Digital Interface (MIDI) data or the like. In this example, the content data is stored in the apparatus. However, the apparatus may externally receive content data as airwaves or through a network (from the server 9, for example). Alternatively, the apparatus may receive PCM data and Table of Contents (TOC) from a medium such as a CD.

The control portion 11 inputs the read content data into the reproduction portion 13. The reproduction portion 13 reproduces the input content data to generate sound signals. In a case where the content data is compressed audio, the reproduction portion 13 decodes the sound signals to output the decoded signals to the superimposition portion 14. In a case where the content data is MIDI data, the reproduction portion 13 controls a tone generator (not shown) to generate musical tones (sound signals) to output the musical tones to the superimposition portion 14.

In addition, the control portion 11 inputs information for identifying the content which is to be reproduced (content identification information) to the superimposition portion 14 to superimpose on the sound signals which will be output so that the content identification information will be superimposed on the sound signals which will be output. The content identification information includes the above-described song information, a song ID and the like. A song ID is provided for each song as a unique ID. By sending the song information retrieved from the content data to the server 9 through the communication portion 15, the control portion 11 retrieves a song ID of the content. More specifically, the server 9, which has the song information storage portion 93 storing a database (see FIG. 4B) in which pieces of song information are associated with song IDs, refers to the song information storage portion 93 on the basis of the piece of song information received by the control portion 92 through the communication portion 91 to identify the song ID. The identified song ID is sent to the control portion 11 of the reproduction apparatus 1. The song information storage portion 93 also has a database such as Compact Disk Database (CDDB). In a case where the control portion 11 has received a TOC from a medium, therefore, the control portion 11 sends the TOC to the server 9 to retrieve song information.

The superimposition portion 14 modulates, for example, the content identification information input from the control portion 11 to superimpose the modulated component on the sound signals input from the reproduction portion 13. The sound signals on which the modulated component has been superimposed are supplied to the speaker 10 to be emitted.

The superimposition scheme of the superimposition portion 14 may be any scheme, but is preferable to be a scheme by which modulated components are inaudible to humans. For example, spread codes (pseudo-noise code (PN code)) such as maximum length sequence (m-sequence) or gold-sequence are superimposed in high frequencies at a very weak level which is not acoustically odd. In a case where information is previously superimposed on content data by use of spread codes or the like, the superimposition portion 14 is unnecessary for the reproduction apparatus 1.

Figure 2B:
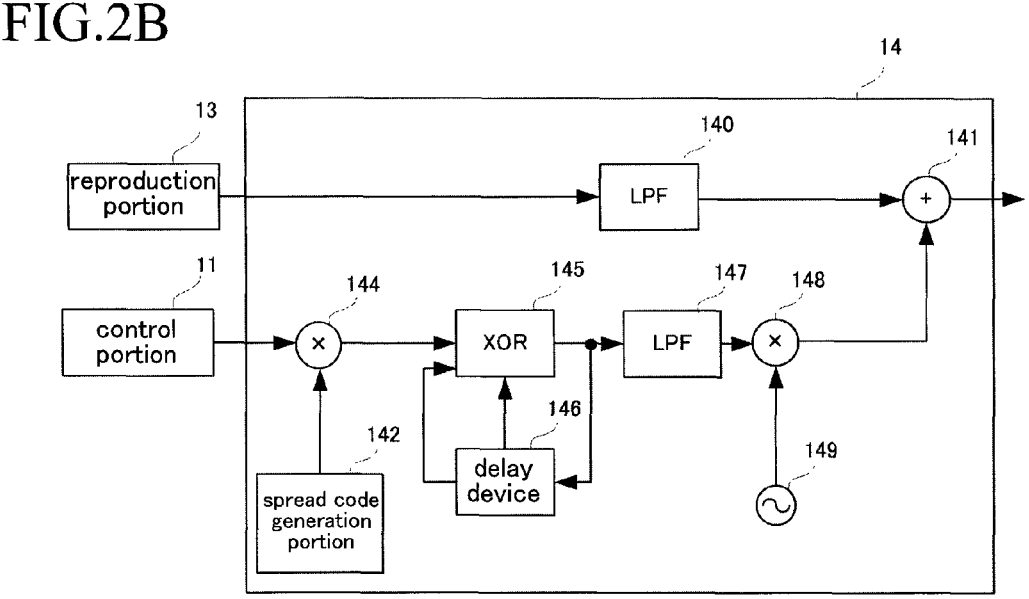
FIG. 2B is a block diagram indicative of an example configuration of a superimposition portion indicated in FIG. 2A.

FIG. 2B is a block diagram indicative of an example configuration of the superimposition portion 14. The superimposition portion 14 has a low pass filter (LPF) 140, an adder 141, a spread code generation portion 142, a multiplier 144, an exclusive OR circuit (XOR circuit) 145, a delay device 146, an LPF 147, a multiplier 148 and a carrier signal generator 149.

The spread code generation portion 142 generates spread codes of m-sequence or the like at regular intervals in accordance with instructions made by the control portion 11. The spread code generated by the spread code generation portion 142 and the content identification information (binarized code sequence using −1 and 1) are multiplied by the multiplier 144. As a result, the spread code is phase-modulated. In a case of bit data of "1", more specifically, the spread code is in phase. In a case of bit data of "0", the spread code is phase-inverted.

The phase-modulated spread code is input to the XOR circuit 145. The XOR circuit 145 outputs an exclusive OR of the code input from the multiplier 144 and an output code of the immediately preceding sample input through the delay device 146. The signal after the differential coding is binarized to −1 or 1. Because of the output of the differential code binarized to −1 or 1, the apparatus which performs demodulation is able to extract the spread code of pre-differential coding by multiplying differential codes of two successive samples.

The differential coded spread code is band-limited within a base band in the LPF 147 to be input to the multiplier 148. The multiplier 148 multiplies a carrier signal (a carrier signal which is higher than an audible band of sound signals of content data) output from the carrier signal generator 149 by the signal output from the LPF 147 to shift the frequency of the differential coded spread code to passband. The differential coded spread code may be upsampled before the frequency shifting. The frequency-shifted spread code is combined with the sound signals of the content data by the adder 141. The sound signals of the content data are limited to a band different from that of the frequency components of the spread codes by the LPF 140.

It is preferable that the frequency band in which the spread codes are superimposed is an inaudible band of 20 kHz or more. In a case where the inaudible band is not available due to D/A conversion, encoding of compressed audio or the like, however, the frequency band of the order of 10 to 15 kHz can also reduce auditory effects. In this example, furthermore, the frequency band of sound signals of content data is completely separated from the frequency band of spread codes by the LPF 140. Even if the frequency band of sound signals of content data slightly overlaps with that of frequency components of pseudo noise, however, it is possible to make it difficult for audience to hear modulated signals and to secure the S/N ratio which enables demodulation of modulated components by the apparatus which collects sounds.

The reproduction apparatus 2 and the reproduction apparatus 3 collect sounds on which spread codes are superimposed with the microphone 20 and the microphone 30, respectively, calculate correlation values between the collected sound signals and the same spread codes as those of the superimposition portion 14 to decode the content identification information (the song information such as the title of a song, the name of a singer and the name of a performer, and the song ID) in accordance with the peaks of the calculated correlation values.

Figure 3A:
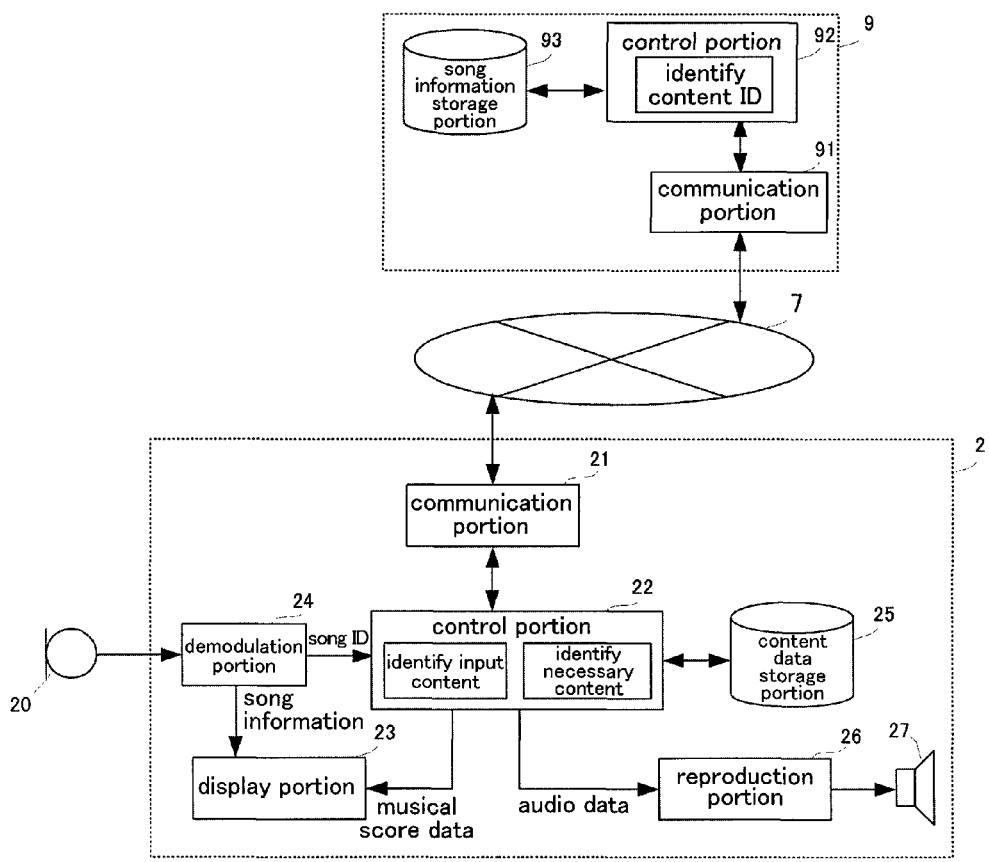
FIG. 3A is a block diagram indicative of a configuration of a reproduction apparatus 2 indicated in FIG. 1A.

FIG. 3A is a block diagram indicative of the configuration of the reproduction apparatus 2 and the server 9. The reproduction apparatus 2 has a communication portion 21, a control portion 22, a display portion 23, a demodulation portion 24, a content data storage portion 25, a reproduction portion 26 and a speaker 27. The demodulation portion 24 demodulates information superimposed on the sound signals input from the microphone 20 to decode content identification information. In this example, the reproduction apparatus has both the display portion and the reproduction portion. However, the reproduction apparatus may be provided with only either the display portion or the reproduction portion.

Figure 3B:
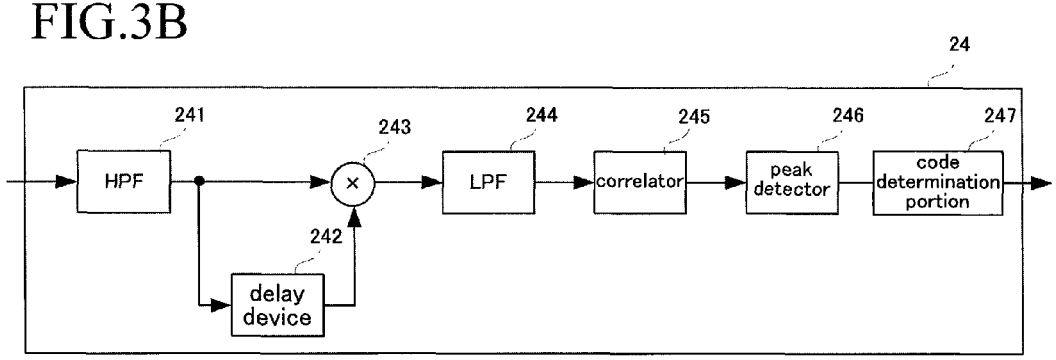
FIG. 3B is a block diagram indicative of an example configuration of a demodulation portion indicated in FIG. 3A.

FIG. 3B is a block diagram indicative of the configuration of the demodulation portion 24. The demodulation portion 24 has an HPF 241, a delay device 242, a multiplier 243, an LPF 244, a correlator 245, a peak detector 246 and a code determination portion 247. The sounds collected by the microphone 20 are input to the HPF 241. The HPF 241 is a filter for removing sound signal components of content data. Signals output from the HPF 241 are input to the delay device 242 and the multiplier 243.

The amount of delay of the delay device 242 is set at the time equivalent to a sample of differential codes. In a case of upsampled differential codes, the amount of delay is set at the time equivalent to an upsampled sample. The multiplier 243 multiplies a signal input from the HPF 241 by a signal of the immediately preceding sample output from the delay device 242 to carry out delay detection processing. Because the differential coded signals are binarized to −1 or 1 to indicate the phase shift from the code of the immediately preceding sample, the spread code before the differential coding can be extracted by multiplying by the signal of the immediately preceding sample.

The signal output from the multiplier 243 is extracted as a base band signal through the LPF 244 to be input to the correlator 245. The correlator 245, which is formed of a finite impulse response filter (FIR filter) (matched filter) in which the spread codes generated in the spread code generator 142 are set as filter coefficients, obtains correlation values between the input sound signals and the spread codes. Because the spread codes employ high autocorrelation such as m-sequence or Gold sequence, positive and negative peak components of the correlation values output by the correlator 245 are extracted at intervals of the spread codes (at the intervals of the data codes) by the peak detector 246. The code determination portion 247 decodes the respective peak components as data codes (a positive peak is 1, while a negative peak is 0) of the content identification information.

Among pieces of information included in the decoded content identification information, the song information such as the title of a song, the name of a composer and the name of a player is input to the display portion 23 to be displayed on a screen. The song ID is input to the control portion 22 to be used for identifying the content. The control portion 22 identifies the content in accordance with the input song ID to further identify content data (the same content data as that of the reproduction apparatus 1, content data specific to the apparatus for itself or content data such as musical score data) which is correlated with the identified content and is necessary for the apparatus for itself. In a case of the reproduction apparatus of FIG. 3A having the function of reproducing audio data and the function of displaying a screen, for example, the control portion 22 identifies audio data and musical score data as the necessary content data. Hereafter, such content data is referred to as correlated content data, while information indicative of the correlated content data is referred to as reproducible content information.

More specifically, the control portion 22 searches the content data storage portion 25 for the correlated content data (audio data and musical score data) corresponding to the song ID. In the content data storage portion 25, as indicated in FIG. 4A, sets of correlated content data reproducible by the apparatus, and their corresponding song IDs and their corresponding pieces of song information are stored. In a case where the control portion 22 has found corresponding correlated content data, the control portion 22 reads out the audio data and the musical score data which are the correlated content data from the content data storage portion 25 to output the musical score data and the audio data to the display portion 23 and the reproduction portion 26, respectively. The display portion 23 displays a musical score in accordance with the input musical score data, while the reproduction portion 26 reproduces the input audio data to generate sound signals. The generated sound signals are output to the speaker 27 to be emitted as sounds.

In a case where correlated content data corresponding to the song ID is not stored in the content data storage portion 25, the control portion 22 sends the decoded song ID and the reproducible content information indicative of the reproduction functions of the apparatus (audio reproduction function, musical score display function, automatic performance function, etc. (including information on musical instrument part reproducible by the apparatus)) to the server 9 connected through the communication portion 21. In the case of the configuration indicated in FIG. 3A, the control portion 22 sends the server 9 the decoded song ID and the reproducible content information indicating that the audio reproduction and the display of musical score are available.

The control portion 92 of the server 9 refers to the song information storage portion 93 on the basis of various kinds of information received through the communication portion 91 to extract correlated content data equivalent to the content data necessary for the reproduction apparatus 2. As indicated in FIG. 4B, the song information storage portion 93 stores a database in which respective song IDs are associated with song information and various kinds of correlated content data. The correlated content data includes song information, audio data, musical score data, song data (MIDI data) and the like.

The control portion 92 retrieves the correlated content data on the basis of the received song ID and reproducible content information. In the example of FIG. 3A, because the reproduction apparatus 2 transmits the reproducible content information indicating that the audio reproduction and the display of musical score are available, the control portion 92 retrieves the audio data and musical score data associated with the received song ID. The retrieved content data is transmitted to the control portion 22 of the reproduction apparatus 2 to be stored in the content data storage portion 25.

The control portion 22 outputs the musical score data transmitted from the server 9 to the display portion 23, and outputs the audio data to the reproduction portion 26. The display portion 23 displays a musical score in accordance with the input musical score data, while the reproduction portion 26 reproduces the input audio data to generate sound signals. The generated sound signals are output to the speaker 27 to be emitted as sounds.

Figure 5:
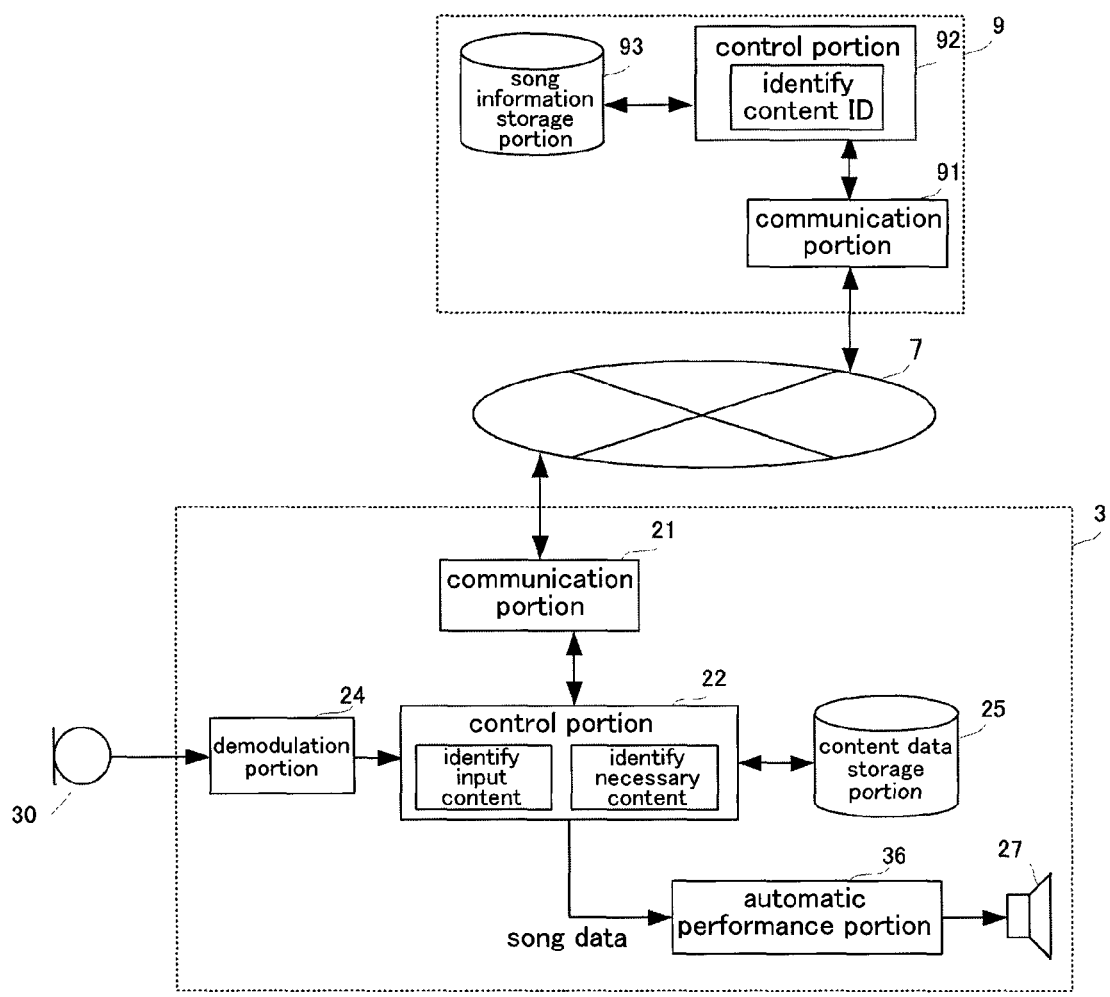
FIG. 5 is a block diagram indicative of a configuration of a reproduction apparatus 3 indicated in FIG. 1A.

In a case where the apparatus has the automatic performance function as the case of the reproduction apparatus 3 indicated in FIG. 5, the control portion 22 searches the content data storage portion 25 for the song data (MIDI data) corresponding to the decoded song ID. If the song data (MIDI data) has been found, the control portion 22 reads out the found song data (MIDI data) to output the song data to an automatic performance portion 36. If corresponding correlated content data is not stored in the content data storage portion 25, the control portion 22 sends the server 9 the decoded song ID and reproducible content information indicating that the apparatus is capable of automatic performance. The reproduction apparatus 3 is configured similarly to the reproduction apparatus 2 indicated in FIG. 3A, with the display portion 23 being removed from the reproduction apparatus 2 and the automatic performance portion 36 being added instead of the reproduction portion 26.

In this case, the control portion 92 of the server 9, which has received from the reproduction apparatus 3 the reproducible content information indicating that the apparatus is capable of automatic performance, retrieves the song data (MIDI data) corresponding to the identified song ID. The retrieved song data (MIDI data) is transmitted to the control portion 22 of the reproduction apparatus 3 to be stored in the content data storage portion 25. The control portion 22 of the reproduction apparatus 3 outputs the song data (MIDI data) sent from the server 9 to the automatic performance portion 36. The automatic performance portion 36 generates musical tone signals (sound signals) with the passage of time in accordance with the input song data (MIDI data). The generated musical tone signals (sound signals) are output to the speaker 27 to be emitted as musical tones (sounds).

The respective functions and workings of the reproduction apparatuses 1, 2, 3 of the sound processing system have been described above with reference to the functional block diagrams. Actually, however, these reproduction apparatuses 1, 2, 3 are configured by apparatuses each having a microcomputer so that many of the workings are done by program processing. Therefore, a concrete example of such program processing will be explained briefly. The reproduction apparatuses 1, 2, 3 are provided with a hardware configuration as indicated in a block diagram of FIG. 6, for example.

Each of the reproduction apparatuses 1, 2, 3 has an input operating elements 71, an input circuit 72, a demodulation circuit 73, a display unit 74, a reproduction circuit 75, a superimposition circuit 76, an output circuit 77, a computer portion 78, a flash memory 79 and a communication interface circuit 80. These circuits and devices 71 to 80 are connected to a bus 81. The input operating elements 71 are manipulated by a user in order to instruct operation of the reproduction apparatus 1, 2, 3. The input operating elements 71 are connected to the bus 81 through a detection circuit 82 which detects manipulations of the input operating elements 71. The input circuit 72 inputs sound signals (sound signals on which song information, song ID and the like are superimposed) from a microphone 83 and an input terminal 84 to convert the input sound signals from analog signals to digital signals to supply the converted sound signals to the bus 81 and the demodulation circuit 73. The demodulation circuit 73 is configured similarly to the above-described demodulation portion 24 of FIG. 3B. However, the demodulation circuit 73 operates in accordance with instructions made by the computer portion 78.

The display unit 74 displays letters, numerals, musical scores, images and the like. The display unit 74 is connected to the bus 81 through a display circuit 85. The display circuit 85 controls the display of letters, numerals, musical scores and the like on the display unit 74 under the control of the computer portion 78. The reproduction circuit 75 generates digital musical tone signals in accordance with musical tone control signals such as key codes, key-on signals and key-off signals to output the generated digital musical tone signals to the superimposition circuit 76. In a case where audio signals are supplied to the reproduction circuit 75, the reproduction circuit 75 decodes the input audio signals to the superimposition circuit 76, for the audio signals are compressed. The superimposition circuit 76 is configured similarly to the above-described superimposition portion 14 of FIG. 2B. However, the superimposition circuit 76 operates in accordance with instructions made by the computer portion 78. The output circuit 77, which includes a mixing circuit and a D/A converter, outputs sound signals to a speaker 86 under the control of the computer portion 78. Instead of this configuration by which the above-described superimposition processing is done by the superimposition circuit 76 which is a hardware circuit, the superimposition processing may be done by program processing by the computer portion 78.

Figure 7:
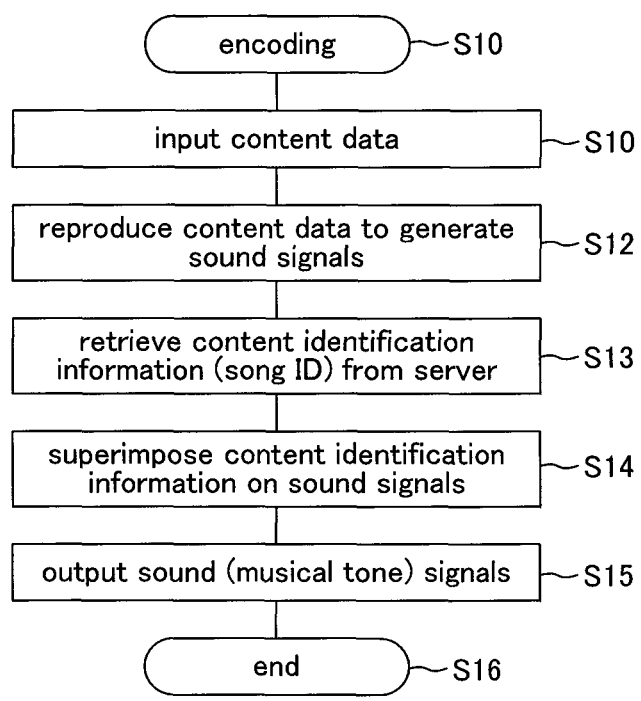
FIG. 7 is a flowchart of an encoding program carried out by the reproduction apparatus indicated in FIG. 6.
Figure 8:
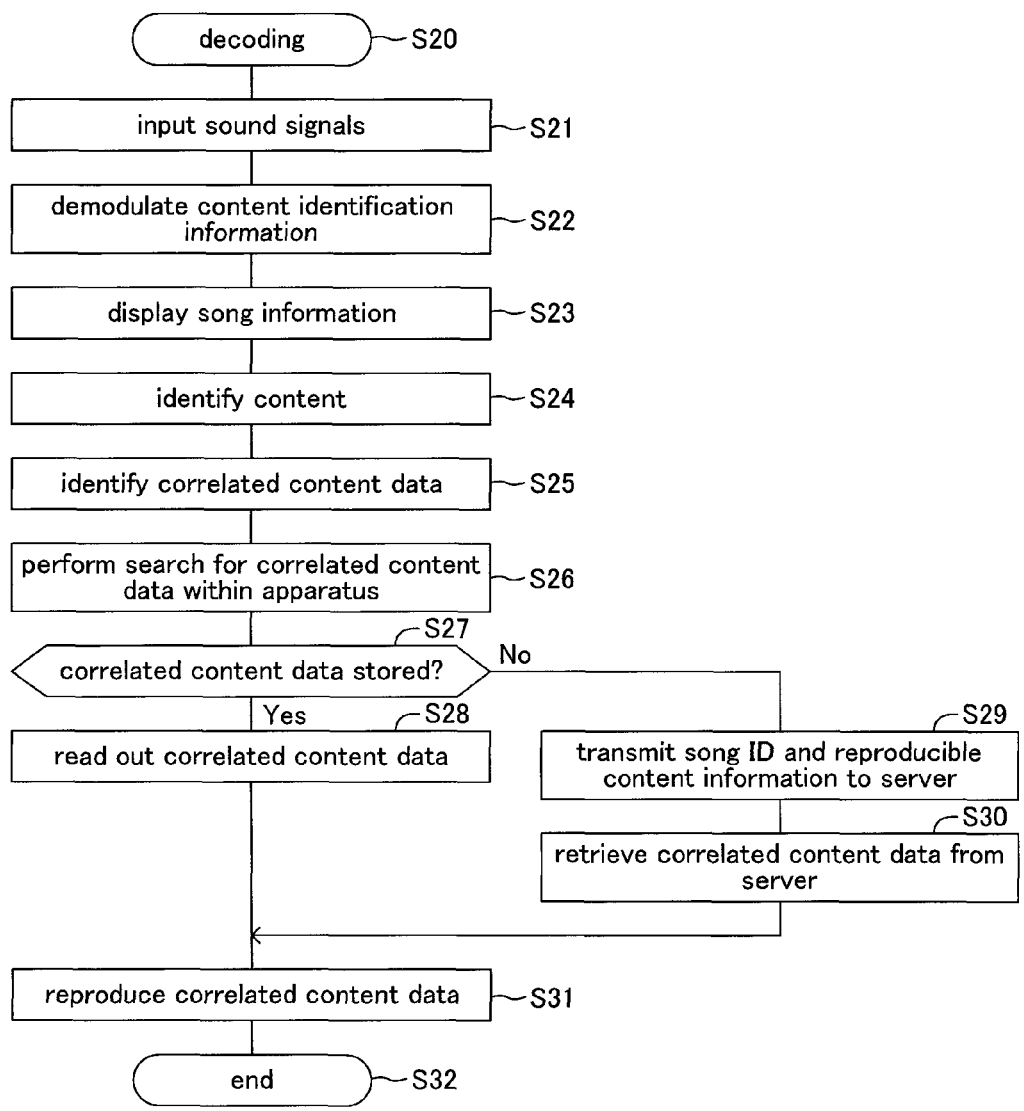
FIG. 8 is a flowchart of a decoding program carried out by the reproduction apparatus indicated in FIG. 6.

The computer portion 78, which has a CPU 78*a*, a ROM 78*b*, a RAM 78*c* and a timer 78*d*, controls the reproduction apparatus by carrying out programs which will be described later. The flash memory 79 serves as a large-capacity non-volatile memory. In the flash memory 79, an encoding program indicated in FIG. 7 and a decoding program indicated in FIG. 8 are stored. In the flash memory 79, furthermore, content formed of song IDs, song information and correlated content data indicated in FIG. 4A is also stored. These data and programs may be previously stored in the flash memory 79. Alternatively, these data and programs may be retrieved externally through the communication interface circuit 80. The communication interface circuit 80 is connected to the network 7 with which the above-described server 9 is connected. However, the communication interface circuit 80 may be internally provided with a wireless communication circuit, an antenna and the like to communicate with the server 9 by radio.

Figure 6:
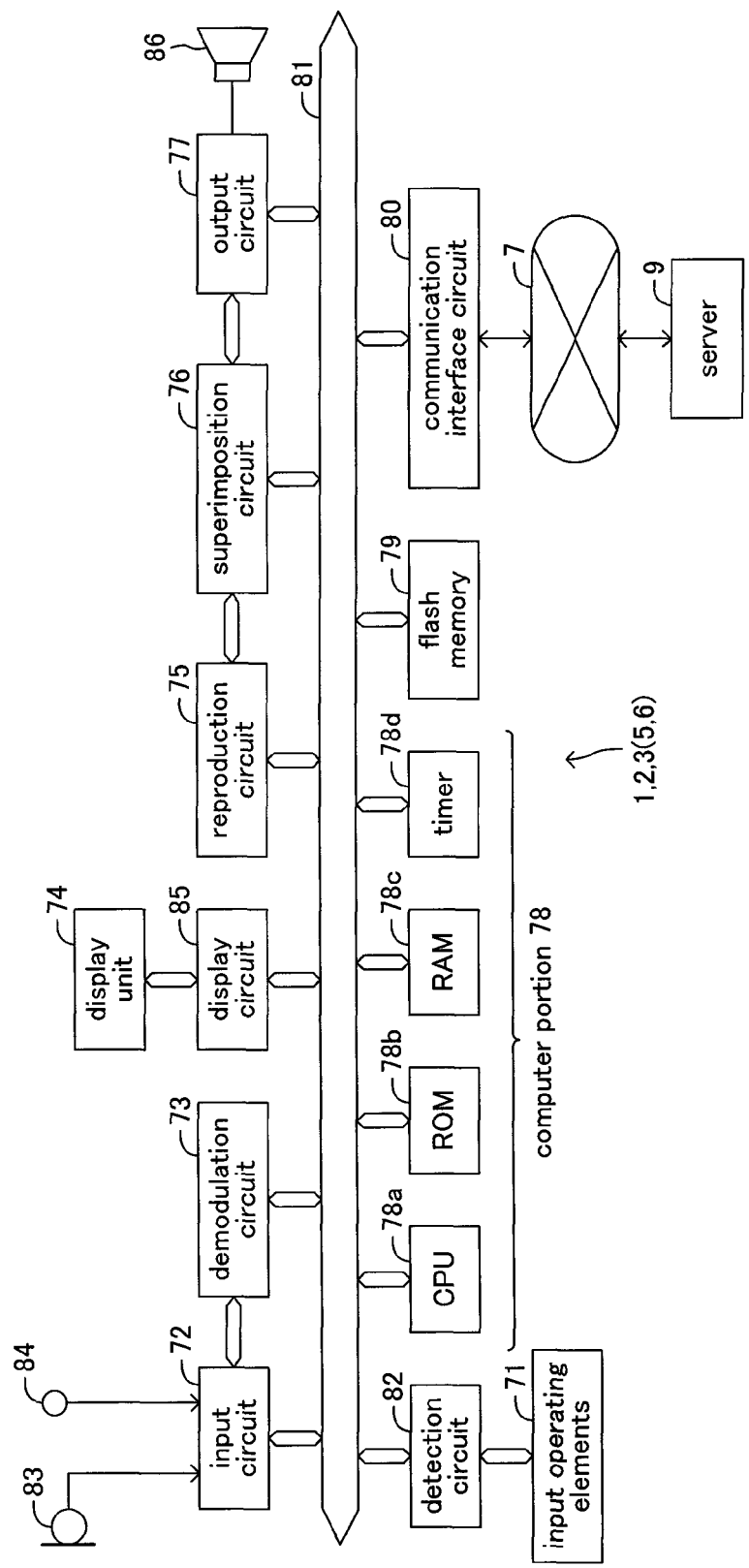
FIG. 6 is a block diagram indicative of an example hardware configuration of the reproduction apparatuses.

Next, cases in which the reproduction apparatuses 1, 2, 3 operate under the program control by use of the hardware circuits configured as indicated in FIG. 6 will be explained. First, the same working as that of the above-described reproduction apparatus 1 will be described. A user manipulates the input operating elements 71 to make the computer portion 78 carry out the encoding program. As indicated in FIG. 7, the encoding program starts in step S10. In step S11, the computer portion 78 reads out content data from the flash memory 79. In this case, the user makes the display unit 74 display information about sets of content data stored in the flash memory 79, and manipulates the input operating elements 71 to designate a set of content data.

In step S12, the computer portion 78 supplies the set of input content data to the reproduction circuit 75, and instructs the reproduction circuit 75 to reproduce the content data set to reproduce sound signals. In this case, if the content data is audio data, the computer portion 78 carries out a separately provided audio reproduction program (not shown) to successively supply audio data input with the passage of time to the reproduction circuit 75. The reproduction circuit 75 decodes the supplied audio data to output the decoded data to the superimposition circuit 76 one after another. If the content data is MIDI data, the computer portion 78 carries out a separately provided MIDI data reproduction program (e.g., an automatic performance program) to supply MIDI data (musical tone control data such as key codes, key-on signals and key-off signals) input with the passage of time to the reproduction circuit 75 one after another. The reproduction circuit 75 allows a tone generator to generate musical tone signals (sound signals) by use of the supplied MIDI data to output the generated musical tone signals to the superimposition circuit 76 one after another.

After step S12, the computer portion 78 transmits, in step S13, song information (the title of a song, the name of a singer and the name of a performer) accompanied with the content data to the server 9 through the communication interface circuit 80 to retrieve content identification information (song ID, in this case). If the computer portion 78 has already obtained the song ID, step S13 is not necessary. Then, the computer portion 78 proceeds to step S14 to output the content identification information (song information such as the title of a song, the name of a singer and the name of a player, and song ID) to the superimposition circuit 76, and to instruct the superimposition circuit 76 to superimpose the content identification information on the sound signals. The superimposition circuit 76 superimposes the content identification information on the sound signals input from the reproduction circuit 75 to output the signals to the output circuit 77. The computer portion 78 then proceeds to step S15 to instruct the output circuit 77 to start outputting the sound signals. In step S16, the computer portion 78 terminates the encoding program. The output circuit 77 converts the input sound signals from digital signals to analog signals to output the converted signals to the speaker 86. As a result, the sound signal on which the content identification information is superimposed are emitted as musical tones from the speaker 86.

Next, the same working as that of the above-described reproduction apparatus 2 will be described. The user manipulates the input operating elements 71 to make the computer portion 78 carry out the decoding program. As indicated in FIG. 8, the decoding program starts in step S20. In step S21, the computer portion 78 inputs the sound signals. More specifically, the computer portion 78 instructs the input circuit 72 to externally input the sound signals (sound signals on which the content identification information including the song information such as the title of a song, the name of a singer and the name of a player, and the song ID is superimposed) through the microphone 83 or the input terminal 84. As a result, the input circuit 72 externally inputs the sound signals to convert the input sound signals from analog signals to digital signals to output the converted signals to the demodulation circuit 73. The computer portion 78 then proceeds to step S22 to instruct the demodulation circuit 73 to demodulate the content identification information which is superimposed on the sound signals. By this step, the modulation circuit 73 demodulates (decodes) the content identification information. In step S23, the computer portion 78 inputs the decoded content identification information from the demodulation circuit 73 to output the song information such as the title of a song, the name of a composer, the name of a player contained in the input content identification information to the display circuit 85. The display circuit 85 displays the song information such as the title of a song, the name of a composer, and the name of a player on the display unit 24.

After step S23, the computer portion 78 proceeds to step S24 to identify the content in accordance with the song ID included in the input content identification information. In step S25, the computer portion 78 identifies the content data necessary for the apparatus. In this case, content data is identified in accordance with the functions which the reproduction apparatus has. However, content data may be identified as correlated content data in accordance with user's manipulation of the input operating elements 71. Alternatively, predetermined content data may be identified as correlated content data. The computer portion 78 then proceeds to step S26 to refer to the content data stored in the flash memory 79 to search for the identified correlated content data. In step S27, the computer portion 78 determines whether all the identified sets of correlated content data are stored in the flash memory 79.

When all the identified sets of correlated content data are stored in the flash memory 79, the computer portion 78 gives "yes" in step S27 to proceed to step S28 to read out all the identified sets of correlated content data from the flash memory 79. When all the identified sets of correlated content data are not stored in the flash memory, the computer portion 78 gives "no" in step S27 to proceed to step S29 to transmit the song ID and the reproducible content information to the server 9 through the interface circuit 80. In this case as well, the reproducible content information may be input in accordance with user's manipulation of the input operating elements 71, or predetermined reproducible content information may be used. By the transmission of the song ID and the reproducible content information to the server 9, the server 9 transmits the correlated content data corresponding to the song ID and the reproducible content information to the reproduction apparatus. In step S30 which follows the above-described step S29, therefore, the computer portion 78 retrieves the correlated content data transmitted from the server 9 through the interface circuit 80.

After the above-described step S28 or step S30, the computer portion 78 reproduces the retrieved correlated content data in step S31, and then proceeds to step S32 to terminate the decoding program. In this case, if the correlated content data is musical score data, the musical score data is output to the display circuit 85. In accordance with the musical score data, therefore, the display circuit 85 displays a musical score on the display unit 74.

If the correlated content data is audio data, the computer portion 78 supplies, by step S31 which is similar to the above-described step S12, the input correlated content data (audio data) to the reproduction circuit 75, and instructs the reproduction circuit 75 to reproduce the content data to reproduce sound signals. If the correlated content data is MIDI data such as automatic performance data and automatic accompaniment data, the computer portion 78 supplies, by step S31 which is similar to the above-described step S12, the MIDI data (musical tone control data such as key codes, key-on signals and key-off signals) to the reproduction circuit 75 one after another to make a tone generator of the reproduction circuit 75 reproduce musical tone signals (sound signals) corresponding to the MIDI data. The reproduced musical tone signals (sound signals) are output to the superimposition circuit 76 one after another. In this case, the sound signals (musical tone signals) supplied from the reproduction circuit 75 to the superimposition circuit 76 simply pass the superimposition circuit 76 under the control of the computer portion 78. Under the control of the computer portion 78, furthermore, the output circuit 77 outputs the sound signals (musical tone signals) to the speaker 86 to emit musical tones from the speaker 86.

According to the sound processing system of this embodiment, as described above, when the reproduction apparatus 1 which reproduces content data emits sounds in which modulated components are included, the other reproduction apparatuses which have collected the sounds reproduce their respective correlated content data, resulting in collaborated operations among the apparatuses. In a case where the reproduction apparatus 1 emits sounds played by a piano, for example, when the reproduction apparatus 2 collects the piano sounds, the reproduction apparatus 2 allows the display portion 23 to display the song information of the piano sounds as well as musical score data as the content correlated with the piano sounds, and also reproduces accompaniment tones (tones of strings, rhythm tones and the like). In addition, the reproduction apparatus 3 emits accompaniment tones by automatic performance.

The superimposition portion 14 of the reproduction apparatus 1 may superimpose not only content identification information but also other information. For example, the superimposition portion 14 may superimpose synchronization information indicative of the timing at which content data is to be reproduced so that the reproduction apparatus 1 can reproduce the content data in synchronization with the reproduction apparatus 2 and the reproduction apparatus 3.

In the case of synchronized reproduction, the sound processing system may be configured such that the reproduction apparatus 1 superimposes information indicative of time elapsed from the start of reproduction as synchronization information whereas the reproduction apparatus 2 and the reproduction apparatus 3 reproduce their respective content data in accordance with the information indicative of the elapsed time. In a case where content data conforms to MIDI data, however, the timing at which peaks of spread codes are extracted may be used as reference clock to achieve the synchronized reproduction. In this case, the control portion 11 controls the superimposition portion 14 so that spread codes will be output at time intervals of the reference clock. The reproduction portion 26 of the reproduction apparatus 2 and the automatic performance portion 36 of the reproduction apparatus 3 can allow respective sequencers to operate with peaks of correlation values calculated at regular intervals being defined as reference clock to conduct automatic performance.

By superimposition of information about the time difference between the timing at which musical tones are generated and the reference clock, furthermore, the apparatus which demodulates the information can achieve synchronized reproduction with further great precision. By additional superimposition of performance information such as note numbers, velocities and the like, the apparatus which demodulates the information is able to carry out automatic performance even if the apparatus does not store MIDI data.

In the case of synchronized reproduction, for example, the collaborated operations are available among the apparatuses such as the reproduction apparatus 1 generating sounds of a piano part, the reproduction apparatus 2 generating sounds of a string part while displaying a musical score, and the reproduction apparatus 3 generating sounds of a drum part. As for the display of a musical score, furthermore, the reproduction apparatus is also able to indicate the current reproduction timing on the musical score (indicating the progression of a song).

Although the above-described example is configured such that the reproduction apparatus 1 reproduces content data to emit sounds from the speaker 10, the reproduction apparatus 1 may be connected to an automatic performance musical instrument (e.g., an automatically played piano) to generate musical tones from the automatic performance musical instrument. The automatically played piano is an acoustic musical instrument in which solenoids provided on key actions of the piano operate in accordance with input MIDI data to depress keys. In this case, the reproduction apparatus 1 outputs only modulated sounds from the speaker 10.

Although the above-described embodiment is configured such that the respective apparatuses store content data, the respective apparatuses may receive content data externally over the airwaves, or may receive content data through the network (from the server 9, for example). Alternatively, the respective apparatuses may retrieve PCM data from a medium such as a CD.

In the case where the apparatuses receive content data through the network, particularly, the sound processing system may be configured such that identified content data is charged so that downloading of the identified content data is allowed after payment. In a case where the server 9 not only stores content data but also charge for the content data, the server 9 is able to conduct both the identification of content data and the charging for the identified content data in response to a reception of a song ID. In a case where a server which charges for content data is provided separately from the server 9 which identify content data, the sound processing system may be configured such that the server 9 which receives a song ID converts the song ID into a unique ID used specifically for the charging to conduct downloading and charging separately.

Example Application 1

Figure 9:
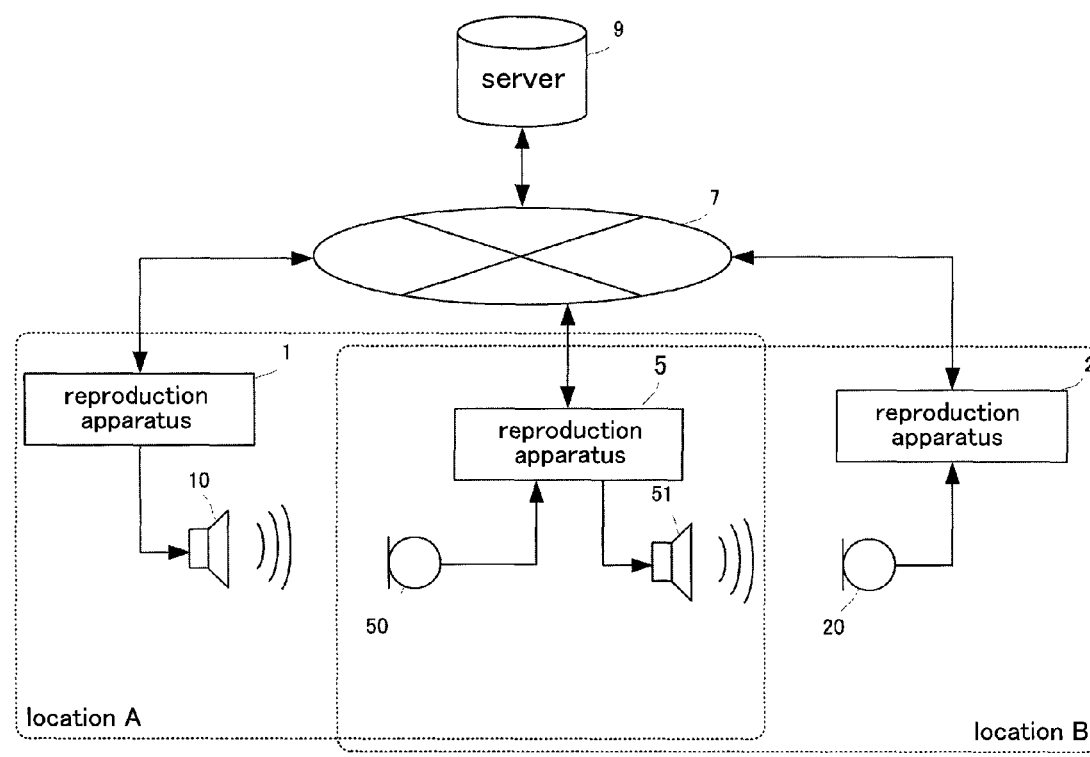
FIG. 9 is a block diagram indicative of a configuration of the sound processing system according to an example application 1.

FIG. 9 is a block diagram indicative of a configuration of a sound processing system according to an example application 1. In this case, the sound processing system is formed of the reproduction apparatus 1, the reproduction apparatus 2, a reproduction apparatus 5 and the server 9 interconnected via the network 7. To the reproduction apparatus 5, a microphone 50 and a speaker 51 are connected. However, the microphone 50 and the speaker 51 may be integrated into the reproduction apparatus 5.

The reproduction apparatus 1, the reproduction apparatus 2 and the reproduction apparatus 5 may be placed at the same location at the same time. In this example, however, the reproduction apparatus 5, which is a portable instrument, is placed at a location A where the reproduction apparatus 1 is placed, to input sound signals to the reproduction apparatus 5. After the input of the sound signals to the reproduction apparatus 5, the reproduction apparatus 5 is transferred to a location B where the reproduction apparatus 2 is placed, to input the sound signals to the reproduction apparatus 2.

Figure 10:
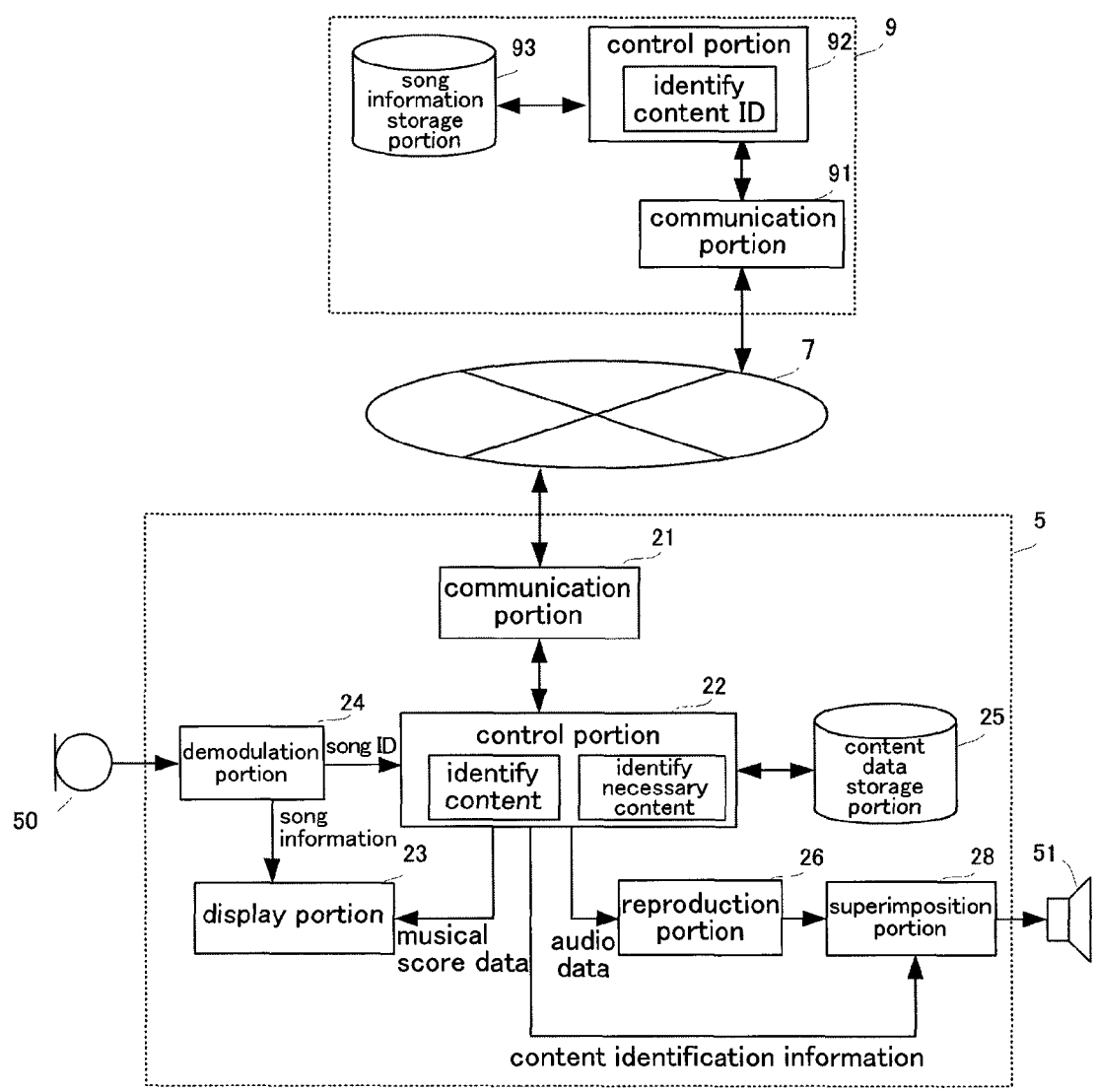
FIG. 10 is a block diagram indicative of a configuration of a reproduction apparatus 5 according to the example application 1.

FIG. 10 is a block diagram indicative of a configuration of the reproduction apparatus 5 and the server 9. In addition to the configuration of the reproduction apparatus 3 indicated in FIG. 3, the reproduction apparatus 5 also has a superimposition portion 28 for superimposing modulated components (content identification information) on sound signals input from the reproduction portion 26 so that the reproduction apparatus 5 can emit sounds on which the modulated components have been superimposed from the speaker 51. The modulated components which are to be superimposed by the superimposition portion 28 may be content identification information that the reproduction apparatus 5 have demodulated before. Alternatively, the modulated components may be content identification information newly generated by the reproduction apparatus 5.

The superimposition portion 28 is configured similarly to the superimposition portion 14 indicated in FIG. 2B. In this case, the reproduction apparatus 5 has the function of superimposing content identification information demodulated by the demodulation portion 24 again on sound signals of content data (audio data) which is to be reproduced, reproducing the sound signals and then emitting the sound signals as sounds. At the location A (e.g., a location away from home), more specifically, the reproduction apparatus 5 collects sounds of content data reproduced by the reproduction apparatus 1 by cable broadcasting, for example, to identify the content data. Then, at the location B (e.g., home), when the reproduction apparatus 5 superimposes content identification information corresponding to the identified content data on correlated content data (e.g., audio data identical to the content reproduced (broadcast) at the location A) to reproduce the correlated content data, the correlated content data is reproduced by the reproduction apparatus 2 as well. As described above, the sound processing system of this example application allows three or more reproduction apparatuses to relay correlated content data to achieve collaborated reproduction of the correlated content data.

The spread codes which the reproduction apparatus 5 superimposes may be either the same spread codes as those codes which the reproduction apparatus 1 superimposes or different spread codes. In a case where spread codes different from those of the reproduction apparatus 1, however, the apparatus which is to demodulate the codes (the reproduction apparatus 2) is to store spread codes which are to be superimposed by the reproduction apparatus 5.

Furthermore, the control portion 22 of the reproduction apparatus 5 is also able to extract, through the LPF, only the sound signals of content data from the sound signals collected by the microphone 50 to store the extracted sound signals in the content data storage portion 25 as recorded data. In this case, the reproduction apparatus 5 is able to superimpose content identification information on the recorded data again to emit sounds in which modulated components are contained. The LPF is not an absolute necessity. More specifically, sound signals in which spread codes are contained may be recorded directly in the content data storage portion 25 so that the recorded sound signals will be output for reproduction later.

In this case, the superimposition portion 28 is not necessary.

Example Application 2

Figure 11:
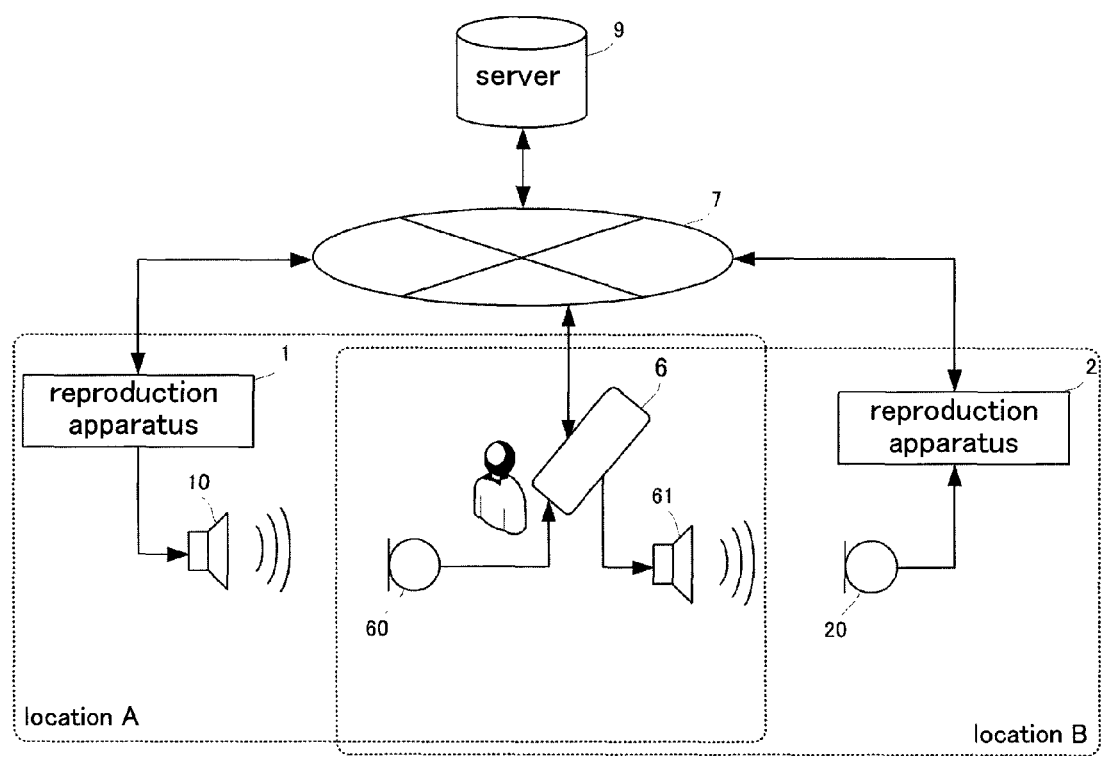
FIG. 11 is a block diagram indicative of a configuration of the sound processing system according to an example application 2.

FIG. 11 is a block diagram indicative of a configuration of a sound processing system according to an example application 2. In this example, the sound processing system is formed of the reproduction apparatus 1, the reproduction apparatus 2, a reproduction apparatus 6 and the server 9 which are interconnected through the network 7. To the reproduction apparatus 6, a microphone 60 and a speaker 61 are connected. However, the microphone 60 and the speaker 61 may be integrated into the reproduction apparatus 6.

The sound processing system of the example application 2 is configured such that the reproduction apparatus 6 transmits collected sound signals to an analysis server (either identical to the server 9 or different from the server 9) so that the server will demodulate the sound signals to identify content. That is, the example application 2 is an example in which the server 9 is additionally provided with an analysis function.

Figure 12:
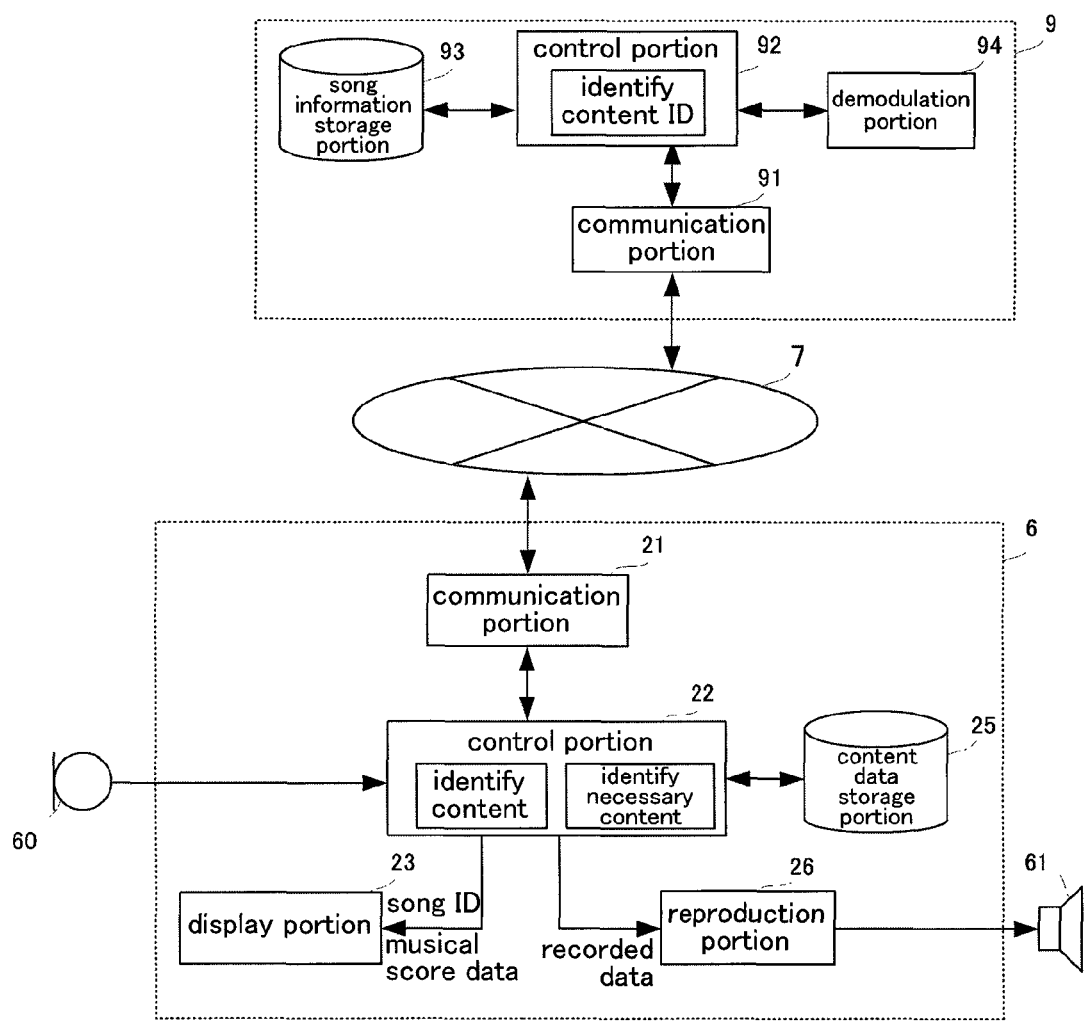
FIG. 12 is a block diagram indicative of a configuration of a reproduction apparatus 6 according to the example application 2.

FIG. 12 is a block diagram indicative of a configuration of the reproduction apparatus 6 and the server 9 of the example application 2. The reproduction apparatus 6, which is a typical digital audio player, is configured similarly to the reproduction apparatus 2 indicated in FIG. 3A but is not provided with the demodulation portion 24.

In this case, the control portion 22 transmits the sound signals collected by the microphone 60 (or encoded data) to the server 9 through the communication portion 21. Furthermore, the control portion 22 also transmits information indicative of the types of content that the apparatus is able to reproduce (reproducible content information).

The server 9 is provided with a demodulation portion 94 having the same configuration and function as those of the demodulation portion 24. The control portion 92 inputs the received sound signals to the demodulation portion 94 to decode the content identification information. The control portion 92 then transmits the decoded content identification information to the control portion 22 of the reproduction apparatus 6. In addition, the control portion 92 extracts correlated content information (content ID) in accordance with the song ID included in the decoded content identification information and the reproducible content information received from the reproduction apparatus 6 to transmit the extracted correlated content information to the control portion 22 of the reproduction apparatus 6.

The control portion 22 displays song information included in the received content identification information on the display portion 23. In addition, the control portion 22 searches the content data storage portion 25 for the content data (audio data and musical score data) corresponding to the received content ID. In a case where the content data is found, the control portion 22 reads out the found content data to output the content data to the reproduction portion 26. In a case where the content data is not found in the content data storage portion 25, the control portion 22 downloads correlated content data from the server 9. The display portion 23 displays a musical score in accordance with the input musical score data, while the reproduction portion 26 reproduces the input content data to generate sound signals. The generated sound signals are output to the speaker 61 to be emitted as sounds.

Furthermore, the control portion 22 of the reproduction apparatus 6 records the sound signals collected by the microphone 60 as recorded data in the content data storage portion 25. In this case, the sound signals in which spread codes are included are directly recorded in the content data storage portion 25. When the recorded data is reproduced at the location B (e.g., home), the correlated content data is reproduced by the reproduction apparatus 2.

As described above, the reproduction apparatus 6 is configured to transmit collected sound signals and to receive analyzed results to operate. In the sound processing system of the example application 2, therefore, the typical digital audio player can serve as the content data reproduction apparatus of the present invention.

The above-described examples are configured such that each reproduction apparatus emits sounds by use of a speaker, generates sound signals by use of a microphone, and transmits sounds by air. However, audio signals may be transmitted by line connections.

Although the above-described embodiment employs the examples in which the reproduction apparatus sends the server information indicative of the types of content which the reproduction apparatus is able to reproduce, the embodiment may be modified such that the reproduction apparatus is to send the server information for identifying the reproduction apparatus (e.g., an ID unique to the reproduction apparatus). In this modification, the server stores information indicative of types of content reproducible on each reproduction apparatus as a database, so that by referring to the database on the basis of the received information for identifying a reproduction apparatus, the server can identify the content data which can be reproduced by the reproduction apparatus.

Furthermore, the embodiment may be modified such that the reproduction apparatus sends the server both the information indicative of the types of content which the reproduction apparatus can reproduce (reproducible content information) and the information for identifying the reproduction apparatus. In this modification, even in a situation where the types of reproducible content vary depending on the operating state of the reproduction apparatus, the server is able to identify content data suitable for the reproduction apparatus. In the above-described example applications 1, 2 as well, furthermore, each of the reproduction apparatuses 1, 2, 5, 6 can be configured by the apparatus indicated in FIG. 6 to control the operation of each apparatus by program processing.

What is claimed is:

1. A content data reproduction apparatus comprising:
a storage device;
an inputting device configured to input a sound signal that has been superimposed with content identification information that identifies sound content of the input sound signal;
a demodulator configured to extract the content identification information from the input sound signal; and
a microprocessor programmed to execute:
a content data identification task that identifies content based on the extracted content identification information;
a correlated data identification task that identifies correlated content data relating to the identified content;
a reproduction task that controls reproduction of the identified correlated content data; and
a content data retrieval task that retrieves, when the storage device does not store the identified correlated content data, the identified correlated content data from a server.

2. The content data reproduction apparatus according to claim 1, wherein the correlated data identification task identifies the correlated content data in accordance with a function that the reproduction task performs.

3. The content data reproduction apparatus according to claim 1, wherein:
the superimposed content identification information includes synchronization information indicative of timing at which the identified correlated content data is reproduced, and
the microprocessor is further programmed to execute a synchronization task that synchronizes the reproduction of the identified correlated content data with the synchronization information.

4. The content data reproduction apparatus according to claim 1, further comprising:
a superimposition circuit that superimposes the content identification information with the sound signal,
wherein the microprocessor is further programmed to execute a superimposition task of controlling the superimposition circuit.

5. The content data reproduction apparatus according to claim 1, wherein the demodulator demodulates a modulation component included in the input sound signal to decode the content identification information to identify the content.

6. The content data reproduction apparatus according to claim 1, wherein the inputting device comprises a microphone that collects an emitted sound.

7. The content data reproduction apparatus according to claim 1, wherein the inputting device receives the sound signal over a transmission line.

8. The content data reproduction apparatus according to claim 1, wherein the correlated content data is content data on at least one of sound or image.

9. The content data reproduction apparatus according to claim 1, wherein:
the input sound signal represents a song; and the content identification information includes a song ID for identifying the song.

10. A content data reproduction apparatus comprising:
a communication device configured to communicate with a server;
a speaker;
a storage device; and
a microprocessor programmed to execute:
a reproduction task that reproduces first sound content data that generates a first sound signal;
a receiving task that controls the communication device to receive first content identification information that identifies the first sound content data from the server;
a superimposition task that modulates the received first content identification information to superimpose the modulated first content identification information with the first sound signal; and
an outputting task that outputs the superimposed first sound signal to the speaker as a sound;
an inputting device configured to input a second sound signal that has been superimposed with second content identification information that identifies content of the second sound signal;
a demodulator configured to extract the second content identification information from the second sound signal,
wherein the microprocessor is further programmed to execute:
a content data identification task that identifies the content of the second sound signal based on the extracted second content identification information;
a correlated data identification task that identifies correlated content data relating to the identified content; and
a content data retrieval task that retrieves, when the storage device does not store the identified correlated content data, the identified correlated content data from the server.

11. The content data reproduction apparatus according to claim 10, wherein:
the second sound signal represents a song; and
the second content identification information includes a song ID for identifying the song.

12. A sound processing system comprising:
a server; and
a content data reproduction apparatus connectable with the server via a content-data communication device,
wherein the content data reproduction apparatus includes:
a storage device;
an inputting device configured to input a sound signal that has been superimposed with content identification information that identifies content of the input sound signal;
a demodulator configured to extract the content identification information from the input sound signal; and
a microprocessor programmed to execute:
a content data identification task that identifies content of the sound signal based on the extracted content identification information;
a correlated data identification task that identifies correlated content data relating to the identified content; and
a reproduction task that controls reproduction of the identified correlated content data;
a content data retrieval task that retrieves, when the storage device does not store the identified correlated content, the identified correlated content data from the server; and
a first sending task that sends, via the content-data communication device, to the server at least either the content identification information or information pertaining to the content data reproduction apparatus and is different from the content identification information, and
wherein the server includes:
a server storage device;
a server communication device configured to receive the at least either the content identification information or the information pertaining to the content data reproduction apparatus from the content data reproduction apparatus via the content-data communication device; and
a server microprocessor programmed to execute:
a server storage task that stores content data in the server storage device;
an extraction task that extracts the content data stored in the server storage device; and
a second sending task that sends the extracted content data to the content data reproduction apparatus.

13. The sound processing system according to claim 12, wherein the information pertaining to the content reproduction apparatus is at least either information about a function that the content data reproduction apparatus has or information that identifies the content data reproduction apparatus.

14. A method of reproducing content data in a content data reproducing apparatus having a storage device, the method comprising:
an inputting step of inputting a sound signal that has been superimposed with content identification information that identifies content of the input sound signal;
a demodulating step of extracting the content identification information from the input sound signal;
a content data identifying step of identifying content based on the extracted content identification information;
a correlated data identification step of identifying correlated content data relating to the identified content;
a reproducing step of reproducing the identified correlated content data; and
a content data retrieval step of retrieving, when the storage device does not store the identified correlated content data, the identified correlated content data from a server.

15. A method of reproducing content data in a content data reproduction having a storage device and a speaker, the method comprising:
a reproducing step of reproducing first sound content data to generate a first sound signal;
a receiving step of receiving first content identification information that identifies the first sound content data from a server;
a superimposition step of modulating the received first content identification information to superimpose the modulated first content identification information with the first sound signal;
an outputting step of outputting the superimposed first sound signal to speaker speaker as a sound;
an inputting step of inputting a second sound signal that has been superimposed with second content identification information that identifies content of the second sound signal;
a demodulating step of extracting the second content identification information from the second sound signal;
a correlated data identification step of identifying the content of the second signal based on the extracted second content identification information;
a correlated data identification step of identifying correlated content data relating to the identified content; and a content data retrieval step of retrieving, when the storage device does not store the identified correlated content data, the identified correlated content data from the server.

* * * * *